US012662334B2

(12) United States Patent
Li et al.

(10) Patent No.: US 12,662,334 B2
(45) Date of Patent: Jun. 23, 2026

(54) MAGNETIC LIQUID METAL PROCESSING METHOD, LIQUID GRIPPER AND MANIPULATION METHOD

(71) Applicant: SUZHOU UNIVERSITY, Suzhou (CN)

(72) Inventors: Xiangpeng Li, Suzhou (CN); Jiangxia Zhou, Suzhou (CN); Kaiwei Wang, Suzhou (CN); Mingkui Zhang, Suzhou (CN); Yue Chen, Suzhou (CN); Lining Sun, Suzhou (CN)

(73) Assignee: SUZHOU UNIVERSITY, Suzhou (CN)

( * ) Notice: Subject to any disclaimer, the term of this patent is extended or adjusted under 35 U.S.C. 154(b) by 970 days.

(21) Appl. No.: 17/731,638

(22) Filed: Apr. 28, 2022

(65) Prior Publication Data

US 2022/0348420 A1    Nov. 3, 2022

(30) Foreign Application Priority Data

Apr. 28, 2021    (CN) .......................... 202110462803.9

(51) Int. Cl.
*B65G 47/92* (2006.01)
*H01F 1/44* (2006.01)
(52) U.S. Cl.
CPC ............. *B65G 47/92* (2013.01); *H01F 1/442* (2013.01)
(58) Field of Classification Search
CPC .. B65G 47/92; H01F 1/442; B25J 7/00; B25J 15/0608
See application file for complete search history.

(56) References Cited

U.S. PATENT DOCUMENTS 10,814,497 B2 * 10/2020 Nagata ................. B25J 15/0616

FOREIGN PATENT DOCUMENTS

| CN | 106935353 A | * | 7/2017 | ............. H01F 1/442 |
| CN | 112388658 A | * | 2/2021 | ............. B25J 15/00 |
| JP | 2016162981 A | * | 9/2016 | |
| WO | WO-2015152062 A1 | * | 10/2015 | ............. H01F 1/445 |

OTHER PUBLICATIONS

Fangxia Li et al., "Magnetically- and Electrically-Controllable Functional Liquid Metal Droplets", Advanced Materials Technologies, vol. 4, No. 3, 1800694 (p. 1-8), Mar. 1, 2019.
Guodi Zhang, "The electrocapillary electrowetting behaviors of liquid Ga-In and Wood alloys in NaOH aqueous solution", China Outstanding Master's Theses Full-text Database, Engineering Technology I vol. No. 2, p. 14-15, p. 17-20, Feb. 15, 2018.

* cited by examiner

*Primary Examiner* — Stephen A Vu
(74) *Attorney, Agent, or Firm* — Anova Law Group, PLLC

(57) ABSTRACT

A method for preparation of a magnetic liquid metal includes: 1) placing A parts by weight of a liquid metal in a container; 2) placing B parts by weight of a metal powder in the container; 3) adding an acidic solution into the container until the liquid metal and the metal powder are submerged; 4) stirring until the liquid metal and the metal powder are sufficiently mixed; and 5) adding water for cleaning the acidic solution, to obtain the magnetic liquid metal by removing the acidic solution. The viscosity and stiffness of the prepared magnetic liquid metal can quickly respond to the stimulus from an applied magnetic field, and a reversible change from liquid to semisolid or solid exists. With a change in magnetic field strengths, the Young's modulus can be regulated in a range from the level of kPa to the level of MPa.

10 Claims, 2 Drawing Sheets

MAGNETIC LIQUID METAL PROCESSING METHOD, LIQUID GRIPPER AND MANIPULATION METHOD

CROSS-REFERENCES TO RELATED APPLICATIONS

This application claims priority to Chinese Patent Application No. 202110462803.9, filed on Apr. 28, 2021, the content of all of which is incorporated herein by reference.

TECHNICAL FIELD

The present invention relates to a method for preparation of a magnetic liquid metal, a microgripper using the magnetic liquid metal, and a gripping method for the microgripper.

BACKGROUND

In recent years, flexible robot grippers have become a hotspot of research both at home and abroad. Traditional robot grippers are made of rigid materials, but they will have many limitations under various specific requirements, such as some narrow passages, uneven grounds, or targets in liquid. However, liquid metals achieve a combination of the advantages of liquid and metal and has the characteristics of miniaturization, lightness and flexibility, thus giving them a great potential in the field of flexible robot grippers. Room-temperature liquid metal gallium and eutectic alloys thereof have high electrical/thermal conductivity, large surface tension, excellent fluidity and low toxicity. Yet, pure liquid metals, due to the absence of variable stiffness therein, cannot be directly applied in researches on flexible robot grippers.

SUMMARY

An object of the present invention is to provide a method for preparation of a magnetic liquid metal, a microgripper and a gripping method, aiming at addressing the above-mentioned technical problems.

To achieve the above object, provided in the present invention is a technical solution that follows.

A method for preparation of a magnetic liquid metal includes:

1) placing A parts by weight of a liquid metal in a container;
2) placing B parts by weight of a metal powder in the container, the metal powder being a single non-magnetic ferromagnetic metal or a mixture of at least one non-magnetic ferromagnetic metal and other metals;
3) adding an acidic solution into the container until the liquid metal and the metal powder are submerged;
4) stirring until the liquid metal and the metal powder are sufficiently mixed; and
5) adding water for cleaning the acidic solution, in order to obtain the magnetic liquid metal by removing the acidic solution.

Preferably, the liquid metal is a gallium indium alloy.

Preferably, the liquid metal includes 75% by mass of gallium and 25% by mass of indium.

Preferably, the acidic solution is hydrochloric acid.

Preferably, the ratio of B to A ranges from 0.1 to 0.4; and the metal powder is an iron powder or a copper-iron alloy powder.

The present invention also provides a microgripper, which includes the magnetic liquid metal. The microgripper includes a bowl-shaped claw, the magnetic liquid metal is disposed within the claw, an electrode is connected to the magnetic liquid metal, and the microgripper also includes a magnet that can apply a magnetic field to the magnetic liquid metal.

Preferably, the claw is made of resin, an inner wall of the claw is coated with a copper powder by application of an adhesive, and at least one through hole for the electrode to pass is disposed on the claw.

Preferably, the adhesive is a pressure sensitive adhesive; a plurality of metal wires are disposed on the inner wall of the gripper.

The present invention also provides a gripping method, which includes the magnetic liquid metal. The gripping method includes:

1) putting an object in an electrolyte;
2) adding the magnetic liquid metal dropwise;
3) applying direct current to the electrolyte via the electrode, wherein a positive electrode is connected to the magnetic liquid metal and a negative electrode is connected to the electrolyte, such that the magnetic liquid metal is diffused in the electrolyte and wraps up the object;
4) applying a magnetic force to the magnetic liquid metal through a magnet, such that the magnetic liquid metal enters into a solid-like state;
5) moving the magnetic liquid metal to drive movement of the object therein to a target position; and
6) removing the magnetic force of the magnet, and energizing the electrolyte via the electrode, wherein the negative electrode is connected to the magnetic liquid metal and the positive electrode is connected to the electrolyte, such that the magnetic liquid metal is restored to a liquid state and concentrated on the electrode, in order to get away from the object.

Preferably, the electrolyte is a sodium hydroxide solution; the magnet is a permanent magnet or an electromagnet.

The present invention overcomes the defects in the Background and has the following advantageous effects: the viscosity and stiffness of the prepared magnetic liquid metal can quickly respond to the stimulus from an applied magnetic field, and a reversible change from liquid to semisolid or solid exists. With a change in magnetic field strengths, the Young's modulus can be regulated in a range from the level of kPa to the level of MPa. In addition, the level of GPa can be reached when the density of iron inside UMMS becomes higher. Therefore, the magnetic liquid metal is featured by magnetic controllability and variable stiffness, and has unlimited potential in the field of flexible robots.

DESCRIPTION OF EMBODIMENTS

The technical solution of the present patent will be further described in detail below with reference to the specific implementations.

Figure 1:
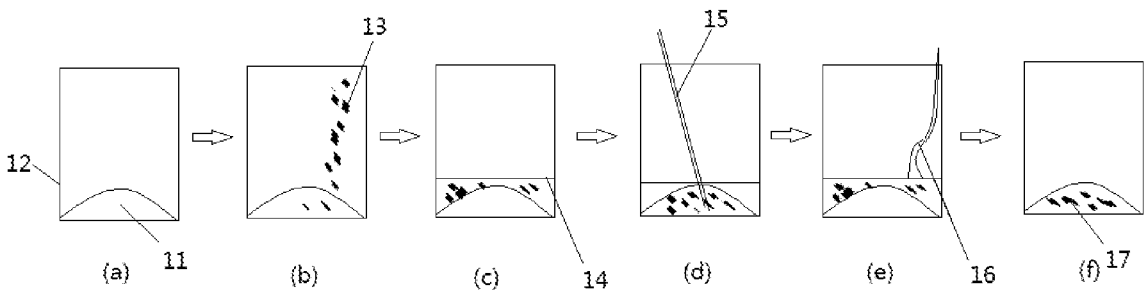
FIG. 1 is a schematic flowchart of a preparation method according to the invention.

As shown in FIG. 1, a method for preparation of a magnetic liquid metal according to the invention includes:

1) placing A parts by weight of a liquid metal 11 in a container 12, as shown in (a);

2) placing B parts by weight of a metal powder 13 in the container 12, as shown in (b); wherein the optimal value for the ratio of A to B is 10:3; the metal powder 13 is a single non-magnetic ferromagnetic metal or a mixture of at least one non-magnetic ferromagnetic metal and other metals, such as iron powder, or copper-iron alloy powder, and this metal powder has a particle size of about 100 nm;

3) adding hydrochloric acid 14 into the container until the liquid metal and the metal powder are submerged, as shown in (c); the hydrochloric acid is used to remove an oxide layer formed in the air by the liquid metal and the metal powder, and this oxide layer will prevent the metal powder and the liquid metal from being mixed;

4) stirring with a glass rod 15, as shown in (d), until the clear state is restored, which indicates that the liquid metal 11 and the metal powder 13 have been sufficiently mixed; and 5) adding water 16 for cleaning the acidic solution, as shown in (e), so that the acidic solution is removed and finally water is separated, to obtain the magnetic liquid metal 17, as shown in (f).

Wherein the liquid metal is a gallium indium alloy, and wherein the liquid metal includes 75% by mass of gallium and 25% by mass of indium.

Figure 2:
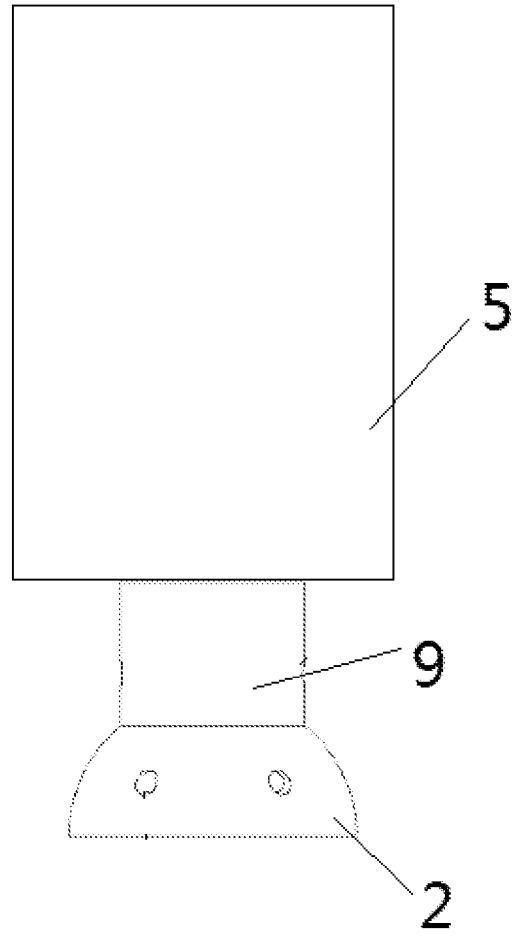
FIG. 2 is a schematic structural front view of a microgripper according to the invention.
Figure 3:
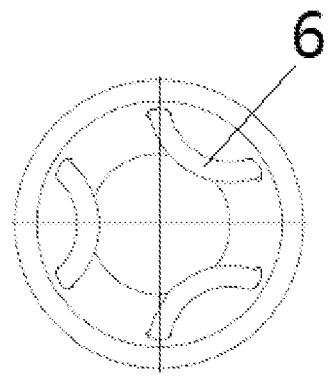
FIG. 3 is a schematic structural bottom view of the microgripper according to the invention.

As shown in FIG. 2 and FIG. 3, the present invention also provides a microgripper, which includes the magnetic liquid metal. The microgripper further includes a bowl-shaped claw 2, a cylindrical base 9 is disposed on an upper portion of the claw 2, and the claw 2 and the base 9 are integrally formed from resin through 3D printing. A pressure sensitive adhesive and then a layer of copper powder are coated on an inner wall of the claw 2 (not illustrated), followed by soaking in the hydrochloric acid for 5 to 6 minutes. The magnetic liquid metal is disposed within the claw 2. The copper powder and the magnetic liquid metal, which have been soaked in the hydrochloric acid, offer great wettability and adsorb each other, which can increase the adsorbability. A through hole (not illustrated) communicated with the base 9 is disposed on the claw 2. After removal of the surface insulating varnish, an enameled wire that serves as an electrode (not illustrated) runs through the base 9 and the through hole, and then is connected to the magnetic liquid metal. A plurality of metal wires 6 are disposed on the inner wall of the claw 2 and are each of a symmetrical arc-shaped structure, and this arc-shaped structure helps to increase the gripping power on the magnetic liquid metal and also drives the object towards a center position during gripping. A magnet 5 that can apply a magnetic field to the magnetic liquid metal is included as well. The magnet 5 is a permanent magnet or an electromagnet. The magnet 5 is disposed on the upper portion of the base 9 and applies a magnetic field by approaching or energization.

Figure 4:
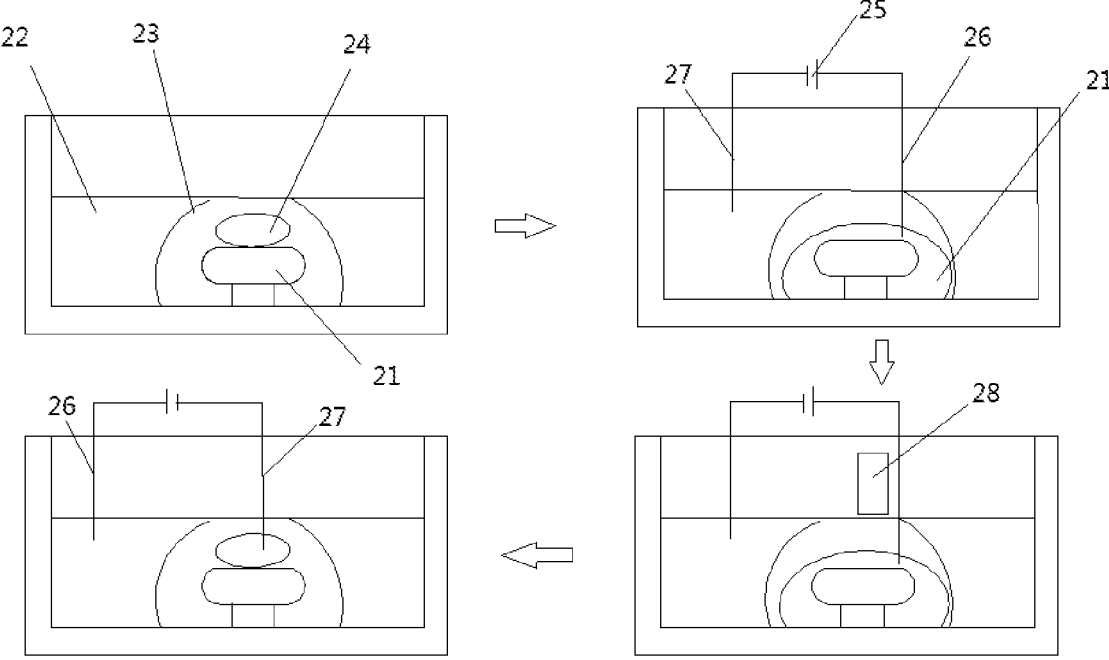
FIG. 4 is a schematic flowchart of a gripping method according to the invention.

The present invention also provides, as shown in FIG. 4, a gripping method, which can make use of the microgripper described hereinabove. The gripping method includes:

1) putting an object 21 in a sodium hydroxide solution 22 (or another electrolyte) and covering the object with the claw 23;

2) adding the magnetic liquid metal 24 dropwise;

3) applying, by a direct current power supply 25, direct current to the sodium hydroxide solution 22 via the electrode, wherein a positive electrode 26 is connected to the magnetic liquid metal 24 and a negative electrode 27 is connected to the sodium hydroxide solution 22, such that the magnetic liquid metal 24 is diffused in the sodium hydroxide solution 22 from the positive electrode towards the negative electrode, so as tow rap up the object 21;

4) applying a magnetic force to the magnetic liquid metal 24 either through approaching of the permanent magnet or through energization by the electromagnet 28, wherein the metal powders in the magnetic liquid metal 24 are connected in a line under the action of the magnetic force, so that the magnetic liquid metal 24 enters into a solid-like state (close to a solid state, with a particular stiffness), thereby fixing the object 21;

5) lifting up the claw 23 to adsorb the magnetic liquid metal 24 by means of the magnetic force, in which case the copper powder on the inner wall of the claw 23 and the magnetic liquid metal 24 have an outstanding wetting effect and are adsorbed on the inner wall of the claw 23; lifting up the magnetic liquid metal 24 to lift up the object 21 therein, and putting the object 21 down at a target position so as to place it in the sodium hydroxide solution 22 again; and 6) removing the magnetic force of the magnet by moving away the permanent magnet or de-energizing the electromagnet, such that the magnetic liquid metal 24 is restored to a liquid state. The sodium hydroxide solution 22 is energized via the electrode in which the negative electrode 27 is connected to the magnetic liquid metal and the positive electrode 26 is connected to the sodium hydroxide solution 22, as a result of which the magnetic liquid metal 24 is concentrated on the electrode to get away from the object, thus completing the transfer operation of the object.

For those skilled in the art, it is apparent that the present invention is not limited to the details of the above exemplary embodiments, and the present invention can be implemented in other specific forms without departing from the spirit or fundamental characteristics of the present invention. Therefore, from any point of view, the embodiments shall be regarded as exemplary and non-limiting. The scope of the present invention is defined by the appended claims rather than the foregoing description, and therefore it is intended that all the changes falling within the meaning and scope of equivalent elements of the claims be included in the present invention. Any reference numerals in the claims shall not be regarded as limiting the claims involved.

In addition, it should be appreciated that although this specification is described in accordance with the implementations, not each implementation only contains one independent technical solution. Such a mode of narration in the specification is merely for the sake of clarity, and those skilled in the art should refer to the specification as a whole. The technical solutions in various embodiments may also be appropriately combined to form other implementations that can be understood by those skilled in the art.

What is claimed is:

1. A microgripper, comprising a magnetic liquid metal, wherein the microgripper comprises a bowl-shaped claw, the magnetic liquid metal is disposed within the claw, an electrode is connected to the magnetic liquid metal, and the microgripper also comprises a magnet configured to apply a magnetic field to the magnetic liquid metal;

wherein at least one through hole for the electrode to pass is disposed on the claw.

2. The microgripper according to claim 1, wherein the claw is made of resin, an inner wall of the claw is coated with a copper powder by application of an adhesive.

3. The microgripper according to claim 2, wherein the adhesive is a pressure sensitive adhesive.

4. The microgripper according to claim 1, wherein:
a plurality of metal wires are disposed on an inner wall of the claw.

5. The microgripper according to claim 4, wherein:
the magnet is disposed on a top end of the base; and
the claw is disposed on a bottom end of the base.

6. The microgripper according to claim 1, further comprising:
a base for the claw;
wherein the electrode passes through the base and the though hole and is connected to the magnetic liquid metal.

7. A gripping method using a magnetic liquid metal, wherein the gripping method comprises:
1) putting an object in an electrolyte;
2) adding the magnetic liquid metal dropwise;
3) applying direct current to the electrolyte via electrodes, wherein a positive electrode is connected to the magnetic liquid metal and a negative electrode is connected to the electrolyte, such that the magnetic liquid metal is diffused in the electrolyte and wraps up the object;
4) applying a magnetic field to the magnetic liquid metal through a magnet, such that the magnetic liquid metal enters into a solid-like state;
5) moving the magnetic liquid metal to drive movement of the object therein to a target position; and
6) Removing the magnetic field of the magnet and energizing the electrolyte via the electrodes, wherein the negative electrode is connected to the magnetic liquid metal and the positive electrode is connected to the electrolyte, such that the magnetic liquid metal is restored to a liquid state and concentrated on the electrode, so as to get away from the object.

8. The gripping method according to claim 7, wherein the electrolyte is a sodium hydroxide solution; the magnet is a permanent magnet or an electromagnet.

9. The gripping method according to claim 7, wherein the magnetic liquid metal is prepared by the following process:
1) placing A parts by weight of a liquid metal in a container;
2) placing B parts by weight of a metal powder in the container, the metal powder being a single non-magnetic ferromagnetic metal or a mixture of at least one non-magnetic ferromagnetic metal and other metals;
3) adding an acidic solution into the container until the liquid metal and the metal powder are submerged;
4) stirring until the liquid metal and the metal powder are sufficiently mixed; and
5) adding water for cleaning the acidic solution, and obtaining the magnetic liquid metal by removing the acidic solution.

10. The gripping method according to claim 7, wherein the gripping method is performed by using a microgripper,
the microgripper comprises a bowl-shaped claw, the magnetic liquid metal is added to the claw in step (2)
an electrode of the microgripper is connected to the positive electrode in step (3), and the object is wrapped in the magnetic liquid metal within the claw of the microgripper;
the microgripper also comprises the magnet configured to apply the magnetic field to the magnetic liquid metal in step (4);
the magnetic liquid metal is moved by moving the microgripper in step (5); and
the electrode of the microgripper is connected to the negative electrode in step (6).

* * * * *